United States Patent Office 2,838,371
Patented June 10, 1958

2,838,371

METHOD OF SEPARATING PLUTONIUM FROM LANTHANUM FLUORIDE CARRIER

George W. Watt, Austin, Tex., and Robert H. Goeckermann, Berkeley, Calif., assignors to the United States of America as represented by the United States Atomic Energy Commission No Drawing. Application October 30, 1947
Serial No. 783,218

2 Claims. (Cl. 23—14.5)

This invention relates to methods for separating plutonium from elements usually associated with it in a neutron-irradiated uranium mass and is particularly concerned with an improvement in oxidation-reduction type methods of separating plutonium from elements associated with it in a neutron-irradiated uranium mass.

Reference herein to any of the elements is to be understood as denoting the element generically whether in its free state or in the form of a compound, unless otherwise indicated by the context.

Plutonium is usually produced by the neutron irradiation of a uranium mass. It is well known that plutonium so produced is a very minor constituent of the uranium mass and that this mass also contains a small amount of radioactive fission products. These fission products include isotopes of elements having atomic numbers from 32 to 64 inclusive. In order to serve a useful purpose it is desirable that the uranium, plutonium and fission products be separated from each other. Many of the separate fission products are useful as radioactive tracers in various fields of research, particularly the chemical, physical, and medical fields. The uranium and plutonium after separation may be used in pile reactors for power production. These elements also have numerous other uses when obtained in the pure state.

The most successful method of separating plutonium from the other constituents of an irradiated uranium mass is the oxidation-reduction method. This method depends upon the fact that plutonium exists in more than one valence state and that compounds formed by plutonium in its various valence states differ widely in their solubility characteristics.

The best known of the oxidation-reduction plutonium separation processes is the bismuth phosphate-lanthanum fluoride process. This process may be arbitrarily divided into four stages or steps: extraction, decontamination, concentration, and isolation. In the first three of these stages, the uranium mass is dissolved in nitric acid, the plutonium separated from the uranium and radioactive fission products, and the ratio of plutonium to the solution in which it is contained is greatly increased. At the completion of the concentration step, the plutonium is contained in a nitric acid solution, which also contains lanthanum and potassium ions. Although the amounts of the constituents of such a solution may vary with individual batches, the proportions are usually approximately the same. A typical batch contains: 8 gal. 2 M $HNO_3$ solution, 8 lbs. $La(NO_3)_3$, 1 lb. $KNO_3$, and 1.25 lbs. $Pu(NO_3)_4$. The purpose of the subsequent operations in the isolation step is the separation of plutonium from the lanthanum and the preparation of a plutonic nitrate salt having a minimum purity of 95% as the final product.

It was found that plutonium could be separated from the lanthanum contained in this solution by precipitating the plutonium directly as the peroxide. Considerable experimentation has been carried out to determine the formula of the plutonium peroxide precipitate. It was found that plutonium peroxide precipitates readily from a dilute acid solution containing tetravalent plutonium when it is treated with hydrogen peroxide, but precipitates much less rapidly from an acid solution containing hexavalent or trivalent plutonium. Indications are that the peroxide precipitates are identical and that the formula of the peroxide is $Pu_2O_7$. Hydrogen peroxide is capable of reducing hexavalent plutonium to the tetravalent state and oxidizing trivalent plutonium to the tetravalent state so that in the above cases it is believed that it is the tetravalent plutonium formed that precipitates. A plutonium peroxide precipitate which has better filterability is formed by tetravalent plutonium ion with peroxide ion in the presence of sulfate ion. This plutonium salt has the formula $Pu_2O_6 \cdot SO_4$ and this is the salt usually precipitated in the isolation cycle.

The plutonium containing solution obtained in the last step of the concentration cycle ordinarily has from 2 to 60% of the plutonium in the hexavalent form. Since Pu(VI) does not form a peroxide of low solubility and since reduction of Pu(VI) by peroxide ion is slow under the conditions employed in the precipitation of the tetravalent plutonium, it was found desirable to reduce the Pu(VI) before precipitating $Pu_2O_6.SO_4$ in the first precipitation of the isolation cycle. The usual method of treating the plutonium solution obtained in the last operation of the concentration step was to add sufficient 30% $H_2O_2$ to the solution to make it 1% $H_2O_2$ by weight and sufficient sulfate ion to make the solution 0.05–0.25 M, followed by digestion of the solution for one hour at 50° C. The solution was then cooled to 20° C., and 30% $H_2O_2$ added continuously over a period of one hour in sufficient quantity to give the equivalent of a 10% by weight excess of 100% $H_2O_2$ in the solution. The plutonium peroxide precipitate thus formed was then separated from the solution.

It was found, however, that this procedure had certain disadvantages. For example, this operation, including heating and cooling the solution, required two and one-half to three hours. The digestion at 50° C. caused a gas evolution, thus producting a plutonium-containing spray and since plutonium is an extremely powerful poison, this spray was considered undesirable from a health standpoint. Iron was sometimes present in the solution as an impurity in such concentration that the rate of the iron-catalyzed decomposition of $H_2O_2$ exceeded the rate of reduction of Pu(VI) by $H_2O_2$ and incomplete reduction of Pu(VI) resulted.

An object of this invention is to provide a method for reducing hexavalent plutonium contained in an aqueous acidic solution to a lower valence state.

An additional object of this invention is to provide a method of precipitating plutonium peroxide in the isolation step of the bismuth phosphate-lanthanum fluoride, plutonium separation process which may be carried out at room temperature in substantially less time than is required by former methods.

Other objects and advantages of the invention will become apparent as the following detailed description progresses.

We have found that hexavalent plutonium contained in an aqueous acidic solution may be converted to a lower valence state by treating the hexavalent plutonium with an alkali sulfite. The sulfite used may be either the normal or the acid sulfite, and includes the ammonium sulfites, and normal ammonium sulfite has been found to be particularly suitable. The reduction takes place readily at room temperatures, and the quantity of sulfite required may be calculated stoichiometrically from the following equations:

$$Pu^{+3} = Pu^{+4} + e^- \quad E_0 = -0.92 \text{ volt}$$
$$Pu^{+4} = Pu^{+6} + 2e^- \quad E_0 = -1.11 \text{ volts}$$
$$Pu^{+3} = Pu^{+6} + 3e^- \quad E_0 = -1.04 \text{ volts}$$
$$H_2O + H_2SO_3 = SO_4^= + 4H^+ + 2e^- \quad E_0 = -0.21 \text{ volt}$$

Although reduction may be effected with stoichiometric quantities of sulfite ion, it has been found preferable to use at least a two to one molal ratio of sulfite ion to hexavalent plutonium ion to decrease the time required for reduction, and to insure that the reduction is complete.

One embodiment of our invention is concerned with the treatment of the hexavalent plutonium contained in the solution obtained in the final step of the concentration cycle of the bismuth phosphate-lanthanum fluoride, plutonium separation process. We have found that the hexavalent plutonium present in the solution obtained in the final step of the concentration cycle of the bismuth phosphate-lanthanum fluoride, plutonium separation process is substantially converted from the hexavalent to the tetravalent state by treating the solution with an alkali sulfite at room temperature for from 5 to 15 minutes. The plutonium contained in the solution may then be substantially completely precipitated from the solution by treatment with hydrogen peroxide. Broadly the process of this invention comprises treating the plutonium-containing solution obtained in the last operation of the concentration step of the bismuth phosphate-lanthanum fluoride plutonium separation process with an amount of alkali sulfite sufficient to convert the hexavalent plutonium present in said solution to the tetravalent state.

The process of this invention has numerous advantages over the method formerly used. For example, the heating and cooling of the plutonium-containing solution is avoided, thus reducing the over-all time required for the peroxide precipitation from about three hours to about an hour and a half. The evolution of poisonous plutonium-containing gas is reduced to a minimum by effecting the reduction of the plutonium at room temperature or less. Substantially all of the hexavalent plutonium contained in the solution is reduced to the tetravalent state prior to treating the solution with hydrogen peroxide, so that losses due to failure of the hexavalent plutonium to precipitate from the solution with hydrogen peroxide are substantially eliminated. An additional advantage is that the sulfite ion introduced into the solution is converted to the sulfate ion by the reduction of the plutonium, and the presence of this ion has been found advantageous in the precipitation of plutonium peroxide.

The sulfite ion may be introduced into the plutonium solution by treating the solution with any of the soluble alkali sulfite salts including the ammonium salts. The salt may be either the normal salt, such as sodium sulfite or potassium sulfite, or the alkali acid sulfite, such as ammonium acid sulfite or sodium acid sulfite. Normal ammonium sulfite has been found to give the most satisfactory results.

Concentration of the sulfite is not particularly critical when present in greater than stoichiometric amounts. In order to insure complete and rapid reduction of plutonium, the concentration should not be substantially less than about a two to one molal ratio of sulfite ion to hexavalent plutonium ion present in solution and the ratio may range as high as forty to one. In an isolation solution with total plutonium concentration of about 0.0040 M and 62% of the plutonium in the hexavalent state (0.0024 M) the preferable concentration of the ammonium sulfite has been found to be about 0.05 M. However, with plutonium present in the above concentration, an ammonium sulfite concentration between approximately 0.005 and 0.10 has been found to give satisfactory results. Any plutonium reduced to the trivalent state by the reducing action of the sulfite ion is quickly oxidized to the tetravalent state by the oxidizing action of the nitric acid in the solution. Substantially all of the plutonium contained in the solution is therefore precipitated as the peroxide of tetravalent plutonium following the sulfite reduction step.

The reduction of the plutonium with ammonium sulfite has been found to proceed rapidly at 25° C. The rate of reduction of hexavalent plutonium contained in an isolation solution has been measured by determining the changes in the heights of the adsorption bands of Pu(VI) with a spectrophotometer. By this method it was determined that the Pu(VI) contained in a typical isolation solution was converted to the (IV) state within five minutes at 25° C. with 0.05 M ammonium sulfite. Experiments were also carried out in which the plutonium concentration was increased to 4.10 g. Pu(VI)/l. and 5.45 g. Pu(VI) 1, with essential identical results as to the time required. The effect of variation of the ammonium sulfite concentration may be further illustrated by the following table. The solution used in the experiments which are the basis for this table contained 0.0040 M plutonium (950 mg. Pu/l.) of which 60% was Pu(VI) (0.0024 M) and 40% was Pu(VI) (0.0016 M). The solution was 1.0 M in $HNO_3$. Ammonium sulfite was added to give the concentration shown in the table and the solution agitated in glass for fifteen minutes. A precipitate of plutonium peroxide was then formed in, and separated from the solution and the amount of Pu(VI) remaining in the solution and Pu(IV) precipitated as the peroxide were determined by radiometric analysis.

TABLE I

[The extent of reduction of plutonium (VI) by different concentrations of ammonium sulfite.]

| $(NH_4)_2SO_3$ (M) | Temp. (° C.) | $(NH_4)_2SO_4$* (M) | After Reduction | |
|---|---|---|---|---|
| | | | Pu (IV) found (percent of total) | Pu (VI) found (percent of total) |
| 0.10 | 50 | 0.00 | 99.4 | 0.1 |
| 0.10 | 25 | 0.00 | 100.6 | 0.2 |
| 0.05 | 25 | 0.00 | 98.5 | 0.3 |
| 0.01 | 25 | 0.00 | 96.0 | 0.3 |
| 0.005 | 25 | 0.00 | 100.5 | 2.1 |
| 0.0025 | 25 | 0.00 | 68 | 33 |
| 0.0025 | 25 | 0.10 | 58 | 47 |
| 0.0010 | 25 | 0.10 | 47 | 58 |

*At time of addition of $(NH_4)_2SO_3$. All samples were 0.1 M in $SO_3^= + SO_4^=$ at time of addition of $H_2O_2$.

Plutonium (VI), plutonium (IV), and plutonium (III) all form precipitates in basic solutions. Because of this characteristic of plutonium all operations of the bismuth phosphate-lanthanum fluoride, plutonium separation process are carried out in acid solutions and the plutonium separation of the isolation step is customarily carried out at approximately 2 N nitric acid concentration. The process of this invention has been tested with nitric acid concentrations from 0.5 N to 2.5 N and it has been found that the acid concentration within this range has no appreciable effect upon the efficiency of this process.

Now that this process has been described it may be further illustrated by the following example.

Example

A solution obtained in the last operation of the concentration cycle of the bismuth phosphate-lanthanum fluoride, plutonium separation process contained the following constituents by weight: $La(NO_3)_3$, 4.24 kg.; $HNO_3$, 3.46 kg.; $KNO_3$, 0.486 kg.; $Pu(NO_3)_4$, 0.612 kg.; and $H_2O$, 23.9 kg. The solution was filtered and 500 grams of 6% nitric acid and 1.85 kg. of 42% $(NH_4)_2SO_3$ was added to the filtrate and the temperature of the solution adjusted to 25° C. Six hundred grams of 30% $(NH_4)_2SO_3$ was then added to the solution and the solution agitated for fifteen minutes. The acidity of the solution was adjusted to a value of 2 N $HNO_3$. A precipitate of plutonium peroxide was then formed in the solution by adding 17.5 kg. of 30% $H_2O_2$ over a thirty-minute period, and the precipitate separated from the solution by decantation.

While there have been described certain embodiments of our invention, it is to be understood that it is capable of many modifications. Thus, while the process of this invention is particularly useful in the isolation step of the bismuth phosphate-lanthanum fluoride plutonium separation process, it may also be used in other cycles of this process to effect the reduction of hexavalent plutonium to the tetravalent state. Changes, therefore, may be made without departing from the spirit and scope of the invention as described in the appended claims, in which it is the intention to claim all novelty of the invention as broadly as possible in view of the prior art.

What is claimed is:

1. The method of separating plutonium from lanthanum ions in an aqueous 0.5 to 2.5 N nitric acid solution which comprises treating the solution at room temperature with $(NH_4)_2SO_3$ in an amount sufficient to reduce the hexavalent plutonium present to a lower valence state, and then treating the solution with $H_2O_2$ thereby forming a tetravalent plutonium peroxide precipitate.

2. The method of separating plutonium from lanthanum ions in an aqueous nitric acid solution which comprises treating the solution at room temperature with ammonium sulfite with a molal ratio of sulfite to hexavalent plutonium ion of from 2 to 1 to 40 to 1, and then treating the solution in the presence of sulfate ion with sufficient $H_2O_2$ to form a tetravalent plutonium peroxide precipitate.

References Cited in the file of this patent

Seaborg et al.: Paper 1.6 in "The Transuranium Elements," vol. 14B, part 1, 1st ed., pp. 25–38. Article prepared and submitted Mar. 21, 1942, and the date relied on.

Hindman et al.: Paper No. 3.2 in "The Transuranium Elements," vol. 14B, part 1, 1st ed., pp. 121–132. Article based on Metallurigical Reports CN–1324 (Feb. 1, 1944), and CK–1371 (Mar. 1, 1944), and this latter date relied on.

Harvey et al.: "The Chemistry of Plutonium," Journal of the Chemical Society, August 1947, pp. 1010–1012.

Seaborg et al.: Jour. of the Am. Chem. Soc., vol. 70, pp. 1128–1134 (1948). Report submitted Mar. 21, 1942.

UNITED STATES PATENT OFFICE
Certificate of Correction

Patent No. 2,838,371

June 10, 1958

George W. Watt et al.

It is hereby certified that error appears in the printed specification of the above numbered patent requiring correction and that the said Letters Patent should read as corrected below Column 4, line 17, for "Pu(VI)1," read $Pu(VI)/1.$; line 23, for "Pu(VI)" read $Pu(IV)$; lines 47 and 48, in the footnote to the table, for "$SO_3^- + SO_4^-$" read $SO_3^= + SO_4^=$.

Signed and sealed this 3rd day of March 1959.

[SEAL]

Attest:
KARL H. AXLINE,
*Attesting Officer.*

ROBERT C. WATSON,
*Commissioner of Patents.*